United States Patent
Cooper

(10) Patent No.: US 7,966,649 B1
(45) Date of Patent: Jun. 21, 2011

(54) SYSTEM AND METHOD FOR LOGIN RESISTANT TO COMPROMISE

(76) Inventor: Timothy William Cooper, Portland, OR (US)

(*) Notice: Subject to any disclaimer, the term of this patent is extended or adjusted under 35 U.S.C. 154(b) by 704 days.

(21) Appl. No.: 12/070,627

(22) Filed: Feb. 20, 2008

Related U.S. Application Data

(60) Provisional application No. 60/890,603, filed on Feb. 19, 2007.

(51) Int. Cl.
 *H04L 9/32* (2006.01)
(52) U.S. Cl. ............ 726/2; 726/4; 726/17; 726/18
(58) Field of Classification Search .......... 713/168, 713/182–186; 726/1–10, 16–20
See application file for complete search history.

(56) References Cited

U.S. PATENT DOCUMENTS

| | | | |
|---|---|---|---|
| 4,184,148 A | 1/1980 | Smagala-Romanoff | |
| 5,712,627 A | 1/1998 | Watts | |
| 6,904,526 B1 * | 6/2005 | Hongwei | 713/182 |
| 7,020,773 B1 * | 3/2006 | Otway et al. | 713/171 |
| 2006/0206919 A1 | 9/2006 | Montgomery et al. | |

* cited by examiner

*Primary Examiner* — Hosuk Song

(57) ABSTRACT

A method for authentication to a computer system by providing a challenge display presenting a plurality of possible second passwords, each of which is associated with an individual response code, each response code being revealed to the user in the same location as the associated password. On the final appearance of the challenge display, all the possible response codes are displayed in sequence, enabling the user to submit the chosen response code by moving a display pointer to the appropriate displayed response code and leaving the pointer there.

4 Claims, 3 Drawing Sheets

SYSTEM AND METHOD FOR LOGIN RESISTANT TO COMPROMISE

CROSS-REFERENCE TO RELATED APPLICATIONS

This application claims the benefit of provisional patent application 60/890,603 filed Feb. 19, 2007 by the present inventor.

FEDERALLY SPONSORED RESEARCH

Not Applicable.

SEQUENCE LISTING OR PROGRAM

Not Applicable.

BACKGROUND

1. Field of Invention

This invention relates to computer systems security, specifically to authenticating an authorized user to a computer system.

2. Prior Art

Many computer systems are made available to a global user base through the use of the Internet. Commonly, users interact with these systems through a World Wide Web browser. Although encryption techniques such as SSL prevent eavesdropping while data travels across the Internet, some users have insecure and compromised computers.

In particular, some of these compromised computers are infected with malware that, unknown to the user, collects the user's login credentials when entered by the user during the login process for authentication to access-controlled computer systems. The malware then surreptitiously transmits the credentials to a malicious third party. This third party can then use these stolen credentials to impersonate the true user, and so perform whatever action the true user is authorized to perform.

One type of malware that does this is key-logging software. In this case, keystrokes the user enters through the keyboard, such as identifiers and passwords, are recorded by the software and then transmitted to the malicious third party. Hardware key-loggers also exist.

When key-logging became a concern, providers of systems for which security is important began to require an additional element in the login process, typically added after the point where the user has entered their user identifier and password and so established provisional authentication. Commonly, this involves the user operating a mouse to point to and click on elements on the display, for example using a virtual keypad to enter a PIN number, or selecting an answer to a question. This credential is not entered through the keyboard, and so is safe from key-logging. However, a new type of malware has been observed which, when the user clicks the mouse, copies the image from the area of the display near the pointer, and then transmits this image to the malicious third party. By selecting only a portion of the display and selecting only at the time the user clicks, this click-activated screen-scraping malware can operate with minimal resources and so avoid detection by the user.

Cryptographic hardware-based systems are available that generate one-time-use codes for second factor authentication purposes, or that incorporate a private key and use public key infrastructure as a means for authentication. However, expense and other shortcomings have precluded widespread adoption. Attempts have been made to emulate the "second factor" provided by these hardware based systems that offer proof of "something you have" by using printed articles where the user must correctly respond to a challenge by determining the correct response using the printed article, typically by looking up a response in a grid. However, while the cost of a printed article may be less than that of a device such as a smart card, the other problems associated with creating, distributing, and carrying a physical article remain and have prevented widespread adoption. These problems include loss, destruction, misplacement, theft and copying.

Onlookers, key-loggers and click-activated screen-scraping malware are still compromising the login credentials of computer users, and in this context the advantages of some embodiments of my invention become clear.

SUMMARY

A method for authenticating a computer user by determining whether the user has knowledge of a second password, without divulging this second password. In a preferred embodiment, the user responds to a challenge display by leaving a display pointer on the appropriate response code.

DRAWINGS

Figures

DETAILED DESCRIPTION

Figure 1:
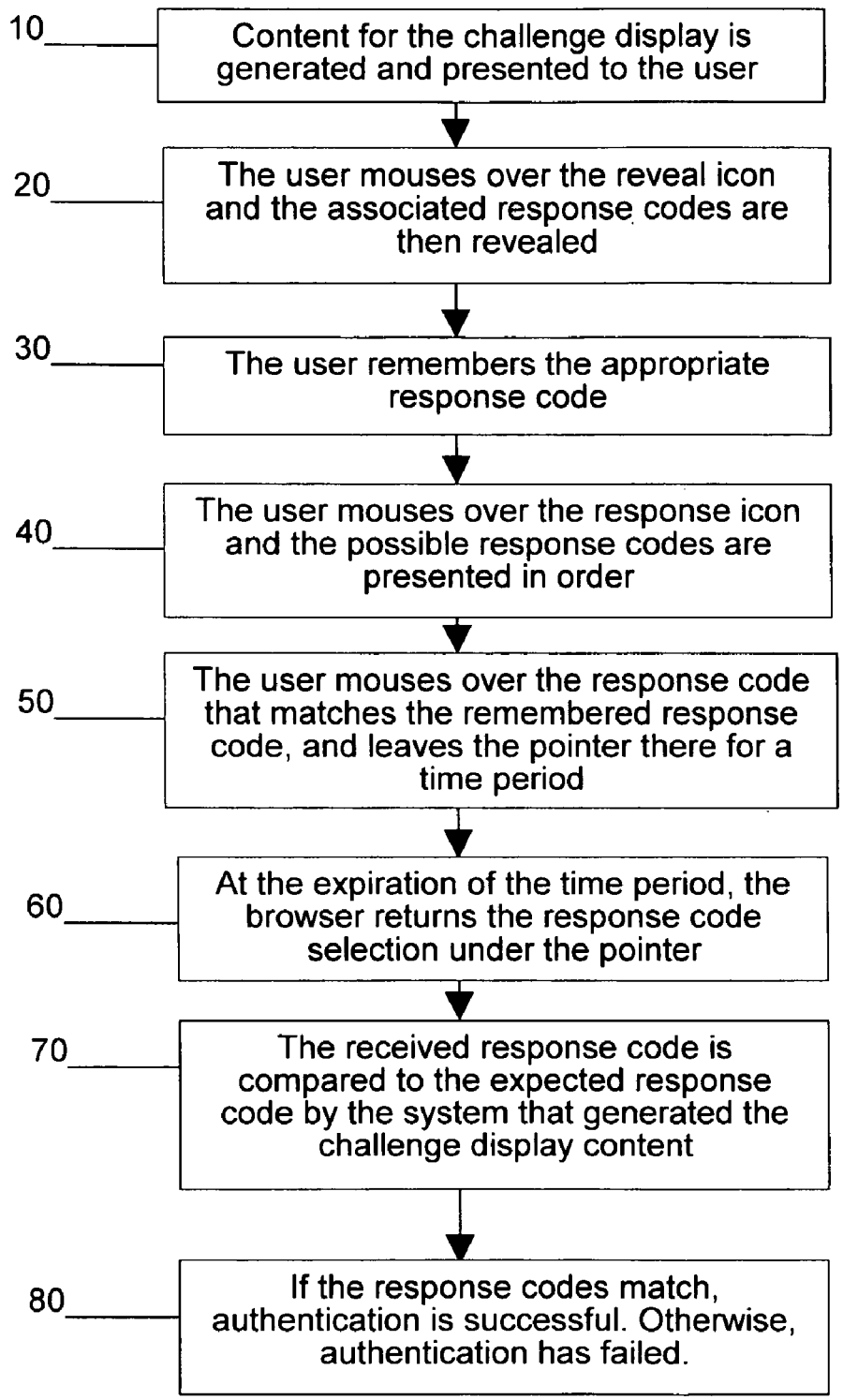
FIG. 1 shows the sequence of steps for an embodiment.
Figure 2:
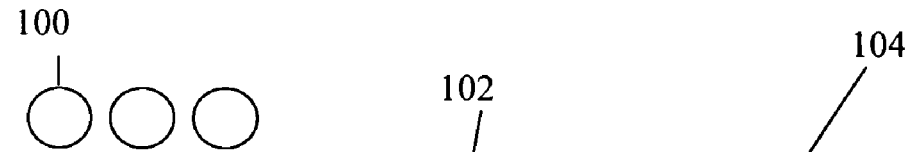
FIG. 2 shows an initial appearance of the challenge display for one embodiment.
Figure 3:
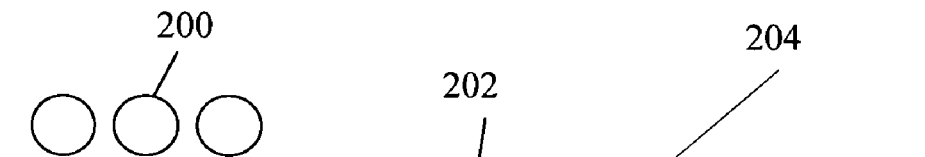
FIG. 3 shows the challenge display revealing response codes for one embodiment.
Figure 4:
FIG. 4 shows the challenge display response submission for one embodiment.

FIGS. 2, 3 and 4—Preferred Embodiment

FIG. 2 shows the initial appearance of the challenge display which is presented to the user after the user has provisionally authenticated, such as by successfully submitting a user identifier and first password. The challenge display in this initial appearance mode shows a set of second passwords 104, including the correct second password 102 visible among many decoy possible second passwords in an order—a sequenced grid in this embodiment—that is easily understood by the user. If necessary, the user can at any later time cause this appearance of the challenge display to be presented again by mousing over the initial appearance icon 100.

FIG. 3 shows the appearance of the challenge display in the case where the user has moused over the reveal appearance icon 200 to cause the challenge display to reveal a set of response codes 204, including the correct response code 202 visible among many decoy possible response codes. Each individual response code is associated with one of the corresponding individual second passwords, in this embodiment by occupying the same position on the display that the second password had occupied. To additionally help the user associate the two, the appearance of the display alternates between showing the second passwords 104 and the response codes 204 approximately once per second. In other embodiments, there may be an alternative manner of association of the second passwords with individual response codes, such as by displaying both the second password and the response code together at the same time, adjacent to each other, in which case there would not be separate initial and reveal appearances, or an alternating appearance, but a single combined appearance.

FIG. 4 shows the appearance of the challenge display in the case where the user has moused over the response appearance icon 300 to cause the challenge display to reveal the possible response codes 304 in a sequence that is easily understood by the user. In this embodiment, the sequence is ascending numeric order. The user submits the desired response code by mousing over the correct response code 302 and leaving the pointer there for more than a certain time period, such as two seconds.

Operation—FIGS. 1, 2, 3, 4

The computer system creates and sends to the user 10 an instance of a challenge display as shown in FIG. 2 that contains a correct second password 102 among many decoy possible second passwords and, although not visible in this appearance mode, an associated correct response code among many decoy response codes. The response codes are associated with the second passwords at random each time a challenge display instance is created, and so the correct response code is likely to be different for each instance. The initial appearance of the challenge display shows the correct second password 102 visible among the decoy second passwords 104 listed in a sequence that is easily understood by the user, such as ascending alphabetic sequence.

In a subsequent appearance mode of the challenge display as shown in FIG. 3 that has been activated by the user mousing over 20 the reveal component icon 200 the correct response code 202 is displayed among all the possible response codes 204 in a manner that enables each response code to be associated with its respective second password by the user. FIG. 3 shows that in this embodiment this association is accomplished by position, as the response code occupies the same location on the display as had the second password it is individually associated with. Additionally, to further help the user associate the two, the appearance of the display programmatically alternates between showing the second passwords 104 and the response codes 204 approximately once or twice per second. The user remembers 30 the correct response code 202.

The user then activates the third appearance mode of the challenge display by mousing over 40 the response icon 300 shown in FIG. 4. In this appearance, the possible response codes 304 are displayed in a list where the sequence is easily understood by the user, in this embodiment ascending numeric. By moving the display pointer to the remembered correct response code 302 and resting the pointer there for more than a certain time period 50 the correct response code is selected without keyboard entry or clicking 60. The computer system compares the received response code to the expected response code 70 and if the selected response code is correct, authentication is successful, otherwise authentication is not successful 80. If authentication is not successful, the computer system may perform any action or inaction necessary to maintain security.

FIGS. 1, 5, 6, 7,—Alternative Embodiment

Figure 5:
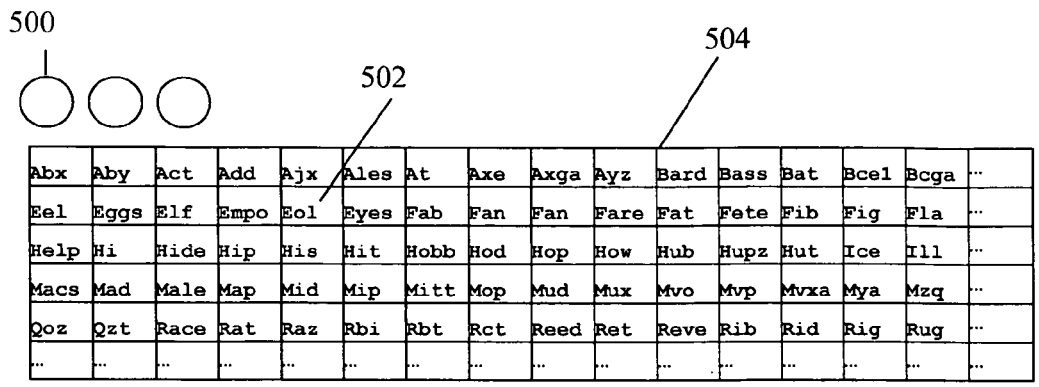
FIG. 5 shows an initial appearance of the challenge display in an alternative embodiment.

FIG. 5 shows the initial appearance of the challenge display which is presented to the user after the user has provisionally authenticated, such as by successfully submitting their user identifier and first password. The challenge display in this initial appearance mode shows passwords, including the correct second password 502 visible among many decoy possible second passwords 504 in an order—a sequenced grid in this embodiment—that is easily understood by the user. If necessary, the user can at any later time cause this appearance of the challenge display to be presented again by mousing over the initial appearance icon 500.

Figure 6:
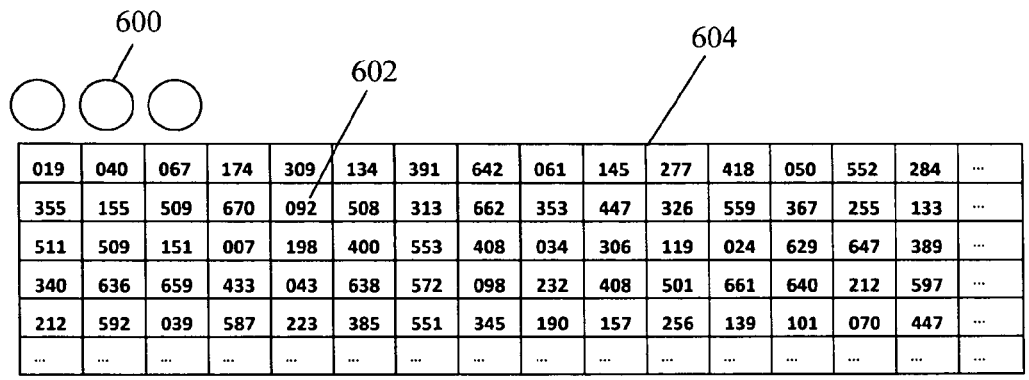
FIG. 6 shows the challenge display revealing response codes in an alternative embodiment.

FIG. 6 shows the appearance of the challenge display in the case where the user has moused over the reveal appearance icon 600 to cause the challenge display to reveal the response codes, including the correct response code 602 visible among many decoy possible response codes 604. Each response code is associated with a corresponding individual second password, in this embodiment by occupying the same position on the display that the second password had occupied. To additionally help the user associate the two, the appearance of the display alternates between showing the second passwords 504 and the response codes 604 approximately once per second. In other embodiments, there may be an alternative manner of association of the second passwords with individual response codes, such as by displaying both the second password and the response code together at the same time, adjacent to each other, in which case there would not be separate initial and reveal appearances, or an alternating appearance, but a single combined appearance.

Figure 7:
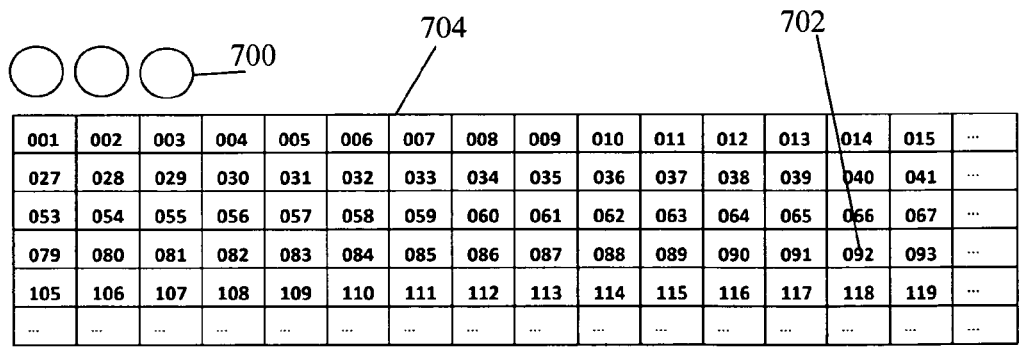
FIG. 7 shows the challenge display response submission in an alternative embodiment.

FIG. 7 shows the appearance of the challenge display in the case where the user has moused over the response appearance icon 700 to cause the challenge display to reveal the possible response codes 704 in a sequence that is easily understood by the user. In this embodiment, the sequence is ascending numeric order. The user submits the desired response code by mousing over the correct response code 702 and leaving the pointer there for more than a certain time period, such as two seconds.

Operation—FIGS. 1, 5, 6, 7

The computer system creates and sends to the user 10 an instance of a challenge display as shown in FIG. 5 that contains a correct second password among many decoy possible second passwords and, although not visible in this appearance mode, an associated correct response code among many decoy response codes. The response codes are associated with the second passwords at random each time the challenge display is created, and so the correct response code is likely to be different for each login.

The initial appearance of the challenge display shows the correct second password 502 visible among the decoy second passwords 504 listed in a sequence that is easily understood by the user, such as ascending alphabetic sequence. In a subsequent appearance mode of the challenge display as shown in FIG. 3 that has been activated by the user mousing over 20 the reveal component icon 600 the correct response code 602 is displayed among the decoy response codes 604 in a manner that enables each response code to be associated with its respective second password by the user. In this embodiment, as shown in FIG. 6 this is done by position, each response code occupies the same position on the display as had the second password it is individually associated with. Additionally, to further help the user associate the two, the appearance of the display programmatically alternates between showing the second passwords 504 and the response codes 604 approximately once or twice per second. The user remembers 30 the correct response code 602.

The user then activates the third appearance mode of the challenge display by mousing over 40 the response icon 700 shown in FIG. 7. In this appearance, the possible response codes 704 are displayed in a list where the sequence is easily understood by the user, in this embodiment ascending numeric. By moving the display pointer to the remembered correct response code 702 and resting the pointer there for more than a certain time period 50 the user selects the correct response code under the pointer to the system 60. The computer system compares the received response code to the expected response code 70 and if the selected response code is correct, authentication is successful, otherwise authentication is not successful 80.

ADVANTAGES, RAMIFICATIONS AND SCOPE

From the description above, a number of advantages of some embodiments of my method for login become evident:

(a) The use of positioning and resting a pointer on the display prevents the acquisition of the second password login credential by both key-loggers and click-activated screen-scrapers.

(b) The use of a response code that is determined randomly within a range of possible response codes means that the user's actions of moving the pointer are unlikely to be able to be replayed by an onlooker, or malware, to successfully authenticate at another time, where the instance of the challenge display will be different.

(c) As the user does not need to point to their second password, but only to the response code on the final appearance of the challenge display, no cue is given to an onlooker during the display of all possible second passwords as to which is the user's valid second password. The selection of the response code in the final step may be observed, but this is of no use to the shoulder-surfer.

(d) The desired degree of security can be attained by selecting a particular quantity of possible response codes. For some applications, 60 possibilities may be sufficient, as shown in the preferred embodiment using two character second passwords. For other applications, many more may be required, as could be implemented with the second embodiment, with any length of second password. For some applications, all possible combinations of two characters of the English alphabet provides 676 possibilities, which may be both convenient and appropriate.

Although the above description contains many specificities, these should not be construed as limitations on the scope of any embodiment, but as exemplifications of presently preferred embodiments. Many other ramifications and variations are possible. For example, while the described method of activation of the different appearances of the challenge display and submission of the chosen response is by locating the pointer without clicking, in the current threat environment for some applications it may be suitable to use traditional point-and-click methods, as screen-scrapers that capture a series of entire displays on clicks are currently less problematic than those that capture only the area near the pointer. Also, other methods of association in the mind of the user between the second password and the response may be used.

Thus the scope of the invention should be determined by the appended claims and their legal equivalents, and not by the examples given.

I claim:

1. A method for authenticating a user to a computer system comprising the steps of:
   a) providing to said user an instance of a challenge display so that said user may identify an appropriate response and
   b) providing a means whereby said appropriate response is likely to be different for each instance of said challenge display for said user and different from a second password said user knows and
   c) providing a means for submitting a chosen response by said user selecting a displayed representation of said chosen response in a display of a plurality of possible responses and
   d) comparing said chosen response with said appropriate response to determine whether said user is authenticated to said computer system, wherein an appearance of said challenge display comprises a plurality of second passwords, said plurality of second passwords including at least one valid second password, known to said user and said computer system, and at least one decoy second password, wherein each of said second passwords is assigned an individual response, whereby access to said computer system can be controlled without divulging said second password to onlookers or malware.

2. The method of claim 1 comprising associating each of said second passwords with said individual response using a spatial arrangement.

3. The method of claim 1 comprising associating each of said second passwords With said individual response using a combined spatial and temporal arrangement.

4. The method of claim 1 wherein the association of said inidividual responses to said second passwords is assigned randomly and so likely to be different for each instance of said challenge display.

* * * * *